March 25, 1924.

J. I. SLOAN

COFFEEPOT

Filed March 13, 1922

1,487,817

INVENTOR
James I. Sloan
BY Arthur E. Brown
ATTORNEY

Patented Mar. 25, 1924.

1,487,817

UNITED STATES PATENT OFFICE.

JAMES I. SLOAN, OF KANSAS CITY, MISSOURI.

COFFEEPOT.

Application filed March 13, 1922. Serial No. 543,244.

*To all whom it may concern:*

Be it known that I, JAMES I. SLOAN, a citizen of the United States, residing at Kansas City, in the county of Jackson and State of Missouri, have invented certain new and useful Improvements in Coffeepots; and I do declare the following to be a full, clear, and exact description of the invention such as will enable others skilled in the art to which it appertains to make and use the same, reference being had to the accompanying drawings, and to the figures of reference marked thereon, which form a part of this specification.

This invention relates to coffee pots and particularly to a coffee pot adapted to brew coffee at a temperature high enough to cause the absorption of the aromatic oils in the ground bean but at a temperature below that at which the aromatic oils will be vaporized.

If the coffee is boiled in the process of making, the desirable qualities, that is, the aromatic oils, are lost in the form of vapor or steam. The ground coffee grains are rendered buoyant and float upon the surface of the liquid unless settled by special treatment.

I have found that highly satisfactory results are accomplished by maintaining the temperature below that at which the aromatic oils may escape but sufficiently high to cause absorption thereof by the liquid within the coffee pot or container.

I prefer, in the process of brewing, to maintain the contents of the coffee pot hermetically sealed and to maintain the temperature of the brew below 212° F. and in order to do this, I have provided a novel form of coffee pot which will be clearly understood by reference to the following description in connection with the accompanying drawings, in which—

Figure 1:
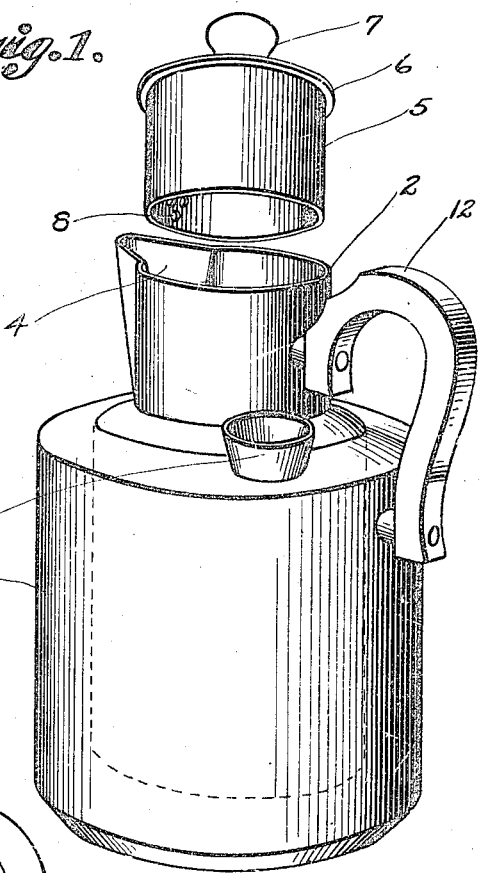
Fig. 1 is a perspective view of a coffee pot constructed in accordance with my invention, the valving cover being shown detached.
Figure 2:
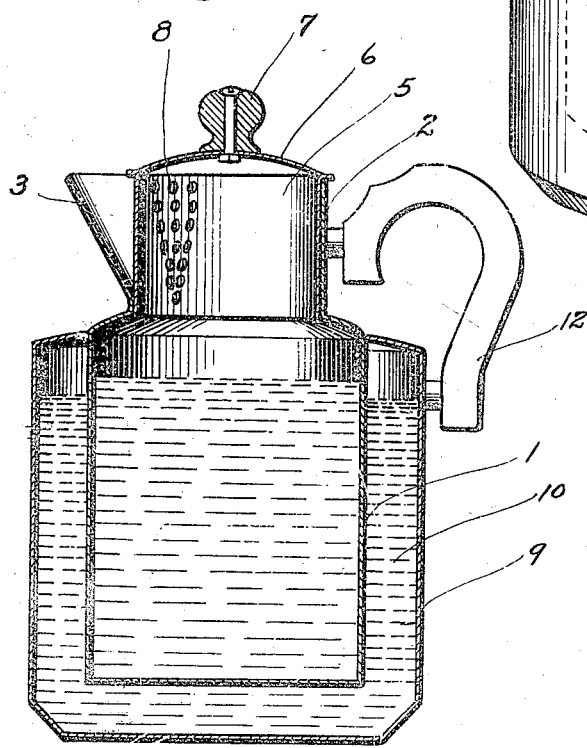
Fig. 2 is a vertical, longitudinal, sectional view through a coffee pot constructed in accordance with my invention, the valving cover being in position to hermetically seal the brew.

In carrying out my invention I provide a double boiler or compartmental receptacle. The coffee receptacle 1 is provided with a constricted neck portion 2, having a flared wall or spout 3, the entrance to the spout being unobstructed, as clearly seen at 4 in Fig. 1. The neck or collar 2 is substantially round and it receives a valving flange 5 of a cover 6, provided with a knob or handle 7. The flange 5 is provided with a plurality of openings or perforations 8 in its wall, which may be moved into and out of register with the opening 4.

The receptacle 1 is carried by an outer casing or receptacle 9, which constitutes a reservoir surrounding the wall of the coffee receptacle 1, the space 10 being adapted to be filled through an opening 11.

The coffee pot is provided with a handle 12, one end of which is secured to the receptacle 9 and the other end to the neck or collar 2, although the manner of securing the handle is immaterial.

When the parts are assembled, water will be placed in the chamber or space 10 to the desired height and permitted to boil, when coffee will be introduced into the receptacle 1 and boiling water poured thereon. Then the cover or cap will be put in place with the openings 8 out of register with the spout opening 4. The coffee pot will be placed over a flame so that the water within the chamber 10 can boil for about fifteen minutes or more. The boiling water in the receptacle 10 will raise the temperature of the liquid in the receptacle 1 to a temperature slightly less than 212° F., or if the water is already at that temperature, it will be maintained at a relatively high temperature but less than the vaporizing temperature.

Since the water in the container 1 will not be agitated and since it will be at less than boiling temperature, the coffee will remain in the bottom of the receptacle 1 but the heat of the water therein will be sufficient to loosen and absorb the aromatic oils in the coffee bean or grain. It is to be understood, of course, that ground coffee of appropriate fineness is to be used.

After the coffee is brewed, the valve cover 5 is turned so that the orifices 8 will register with the opening 4 so that the coffee may be poured, it being obvious, of course, that the orifices 8 also serve as a strainer.

An important feature of the invention aside from the generic idea of providing a double walled container is the brewing of coffee so that when the valving cover is removed, the container 1 can be readily cleaned because the spout 3 has no obstructing walls like the ordinary coffee pot which renders the introduction of brushes and cloths into the spout for cleaning purposes very difficult. The unbroken merging wall of the spout 3 can be readily cleaned and freed of accumulated coffee in a most convenient manner.

In view of the fact that the brew will not boil within the coffee pot, the degree of excellency of the coffee may be maintained without special attention, which is necessary where the coffee is brought to a boil momentarily before pouring in the settling liquid.

I have found in actual practice that considerable latitude can be had as to time in brewing the coffee and that a very excellent product will result when the brew extends over even an appreciable period but where the water in the container 10 is at the boiling point and the boiling water is poured into the receptacle, on top of the coffee and the cover immediately put in closing position, I find that satisfactory results are obtained by brewing the coffee from fifteen to twenty minutes.

What I claim and desire to secure by Letters Patent is:

1. A coffee pot comprising a coffee container to receive the coffee and liquid, a supplemental liquid container about the first named container having a water chamber surrounding the first container, a constricted neck for the first named container having a wall merging into an unobstructed spout, and a cover having a flange receivable within the neck and provided with perforations adapted to be brought into and out of register with the spout.

2. A coffee pot comprising an inner chamber having a constricted neck with an unobstructed spout opening, a cover having a depending flange for closing the spout opening and the top of the neck, and an outer receptacle closing the major portion of the first named receptacle and providing a water space about the same.

In testimony whereof I affix my signature.

JAMES I. SLOAN.